United States Patent [19]  
Harrison

[11] 3,852,390  
[45] Dec. 3, 1974

[54] METHOD FOR FILLING THIN WALL CUP CAVITIES WITH PLASTIC BEADS

[75] Inventor: James M. Harrison, Forth Worth, Tex.

[73] Assignee: Crest Container Corporation, Fort Worth, Tex.

[22] Filed: Aug. 25, 1972

[21] Appl. No.: 283,936

Related U.S. Application Data

[63] Continuation-in-part of Ser. No. 126,628, March 22, 1971, abandoned.

[52] U.S. Cl............... 264/53, 264/51, 264/321, 264/325, 264/DIG. 10, 425/417
[51] Int. Cl............................................. B29d 27/00
[58] Field of Search ... 264/51, 53, DIG. 7, DIG. 10, 264/321, 325; 425/417; 222/143; 215/10

[56] References Cited

UNITED STATES PATENTS

| 2,951,260 | 9/1960 | Harrison et al. | 264/DIG. 10 |
| 3,260,781 | 7/1966 | Lux et al. | 425/817 |

Primary Examiner—V. P. Hoke
Attorney, Agent, or Firm—Kinzer, Plyer, Dorn & McEachran

[57] ABSTRACT

This is concerned with a method and apparatus for molding thin wall cups out of foam polystyrene and is specifically concerned with a method and apparatus for filling a thin wall mold, for example on the order of 0.030 to 0.050 inches thick so that defects and holes will not result in the finished cup.

3 Claims, 2 Drawing Figures

PATENTED DEC 3 1974　　　　3,852,390

INVENTOR.
James M. Harrison
BY Parker, Carter & Markey
Attorneys.

METHOD FOR FILLING THIN WALL CUP CAVITIES WITH PLASTIC BEADS

Other objects will appear from time to time in the ensuing specification and drawings. This is a continuation-in-part of Ser. No. 126,628, filed Mar. 22, 1971 now abandoned.

SUMMARY OF THE INVENTION

This invention is concerned with a method and apparatus for molding thin wall cups out of foam polystyrene beads which insures that the finished cup will not have holes in the area of the stacking ledge.

A primary object of the invention is a method of filling a thin wall cup mold with an airstream that provides compensating turbulence at the off-set annulus.

Another object is a method of filling a thin wall cup mold which is designed and constructed to provide a stacking ring or lip in the bottom of the finished cup.

Another object is a mold filling method for thin cups made of foam polystyrene which provides compensating turbulence.

BRIEF DESCRIPTION OF THE PREFERRED EMBODIMENT

Figure 1:
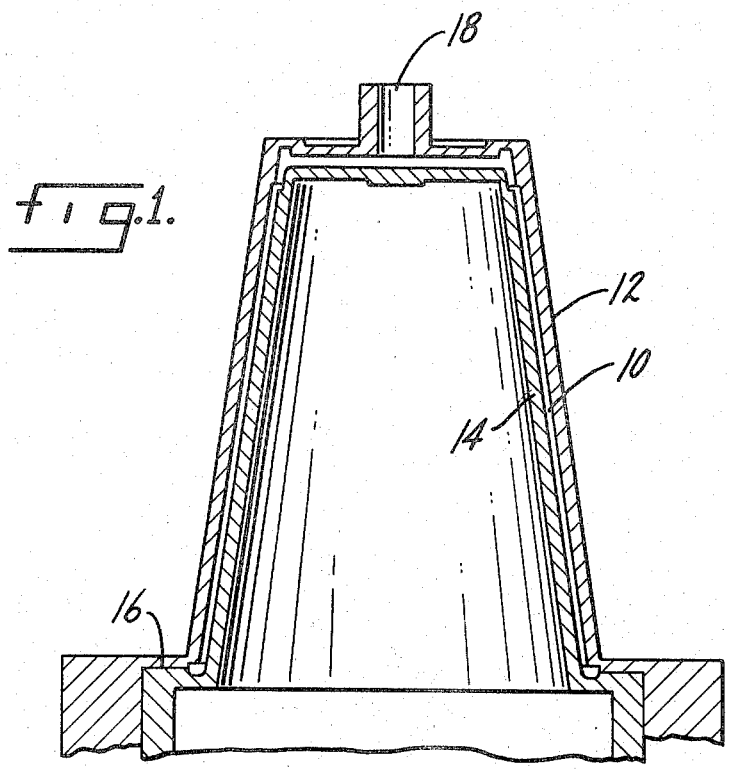
FIG. 1 is a cross-section through a cup mold.

In FIG. 1 a cup mold or cavity is indicated generally at 10 and is defined by a cavity element 12 and a core element 14. The cavity and core elements are adapted to be opened and closed and, when closed, they come together generally at a parting line 16. It will be noted that the molding cavity 10 is in the shape of a thin wall cup and, in the present invention, the cup is to be preferably on the order of 0.030 to 0.050 inches thick. In that regard, the invention may be thought of as primarily concerned with filling mold cavities for cups intended to be used in automatic coin-controlled vending machines, although it is not restricted thereto.

Both the core and cavity elements may have suitable chambers for heating fluids, such as hot water or steam or hot air and for cooling fluids, such as cold water, all of which is conventional in foam molding.

The plastic material takes the form of finely divided beads, for example foam polystyrene impregnated with a blowing agent such as pentane or methane. The beads in finely divided form are initially introduced into the molding cavity and, when heat is applied, they expand and fuse with one another to form an integral, dimensionally stable article. Molding cups out of such beads is well known, but for years filling the mold cavity completely with beads on a rapid time cycle basis has been a constant source of problems. This is particularly true when molding a quite thin walled article.

It is conventional to provide an inlet port in the center of the cavity element, as at 18 in FIG. 1 through which the beads will be introduced. The inlet port 18 opens into the cavity in what will be the bottom of the cup. A vent or outlet is conventionally provided around what will be the lip of the cup in the general vicinity of the parting line 16. An airstream is created through the molding cavity entering through inlet 18 and departing through the 360° annulus at 16. The airstream may be created by a positive pressure applied at or through the inlet to blow the polystyrene beads into the cavity with the airstream exhausting through the 360° vent at what will be the lip of the cup. The vent itself is sufficiently small such that the beads cannot escape and the result will be that the cavity will fill uniformly and fully with beads. Conventional airstream filling procedures such as shown in U.S. Pat. No. 3,125,780 issued Mar. 24, 1964 and U.S. Pat. No. 3,162,705 issued Dec. 22, 1964 may be used.

It is desirable to provide a stacking rim or an abutment in the bottom of the finished cup which may take the form of a continuous small rim on the inner surface of the side wall of the cup directly next to the bottom. It may be continuous or it may be in a series of disconnected segments or protrusions. Such a stacking lip or rim is customarily formed by providing an offset in the small end of the core element, as shown at 20 in FIG. 2. But such an offset has a tendency to create turbulence in the airstream as it turns the corner on its way down the side walls and will quite often result in the cavity being incompletely or partially filled in one or more points around the stacking rim of the cup resulting in a "leaker" or "weeper."

Figure 2:
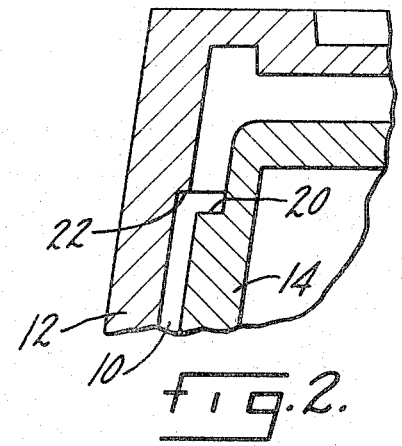
FIG. 2 is an enlargement of a portion of FIG. 1.

I find it desirable to structure the mold such that the turbulence that would otherwise be caused in the airstream during filling will be avoided. This can be done by structuring the cavity element, opposite the offset, in a manner such that a smooth airstream will result. For example, as shown in FIG. 2, I provide a projection or step 22 in the small end of the cavity element at what may be considered the corner. This projection or rim may be considered to be opposite and to correspond to the offset 20 in the core element which creates the stacking rim. The precise shape and proportioning of the rim or projection on the cavity element and its precise relationship and disposition relative to the offset in the core element is not considered critical. If, instead of using a continuous stacking rim in the bottom of the cup, a series of disconnected segments or lugs are used, the projection 22 in the cavity element may still be continuous so as to avoid the problem of proper alignment and matching of one to the other. Or it may be discontinuous. But the point is that the formation at what may be considered the corner of the cavity element where the airstream changes direction to flow down the side wall should be structured to create what may be considered a counter-turbulence as to nullify the tendency of the core offset to create turbulence which results in leakers.

The use, operation and function of my invention are as follows:

I am concerned with a method of filling a thin wall cup mold with lightweight foam polystyrene beads. Foam cups have been on the market for many years and small openings at the corners at or adjacent the bottom of the cup in the resulting article have been a continuous problem. Such cups have had walls that are on the order from 0.060 to 0.100 inches thick.

The problem has been emphasized recently in connection with the introduction of thin wall cups. By thin wall I refer to from 0.030 to 0.050 inches of thickness for the walls. Such thin wall cups have all of the advantages of conventional foam cups but they are also capable of being used in automatic coin-controlled vending machines although they are not restricted thereto.

In any event, the extreme thinness of the molding cavity required to produce such cups makes it quite critical and highly important that whatever filling method is used must be highly reliable and must insure full and uniform filling of the cavity, particularly at and adjacent the bottom. The troublesome area where the airstream changes directions and starts down the side wall of the cavity must be fully filled so that the resulting cup will not leak.

In thin wall foam cups an internal stacking rim at the bottom of the cup is highly desirable in most, if not all, applications. But the turbulence in the filling airstream caused by the offset in the end of the core element has created a problem. This can be solved by structuring the wall of the cavity element, for example, providing a corresponding offset in the cavity element opposite the offset in the core so the turbulence and incomplete filling at this point will not result. The position of shoulder 22 is not believed to be critical. As shown in FIG. 2, it is placed more or less opposite surface 20. It is believed that the airstream from inlet 18, as it starts down the side of the cavity, will hit shoulder 20 and turn or deflect outwardly and upwardly. So that in that sense, shoulder 22 should be opposite and somewhat above shoulder 20 so as to redeflect the air back down the cavity wall in as smooth and uninterrupting a flow as possible. Quite obviously, if shoulder 22 was on the same level as shoulder 20, it would accomplish this purpose. This is to say that the shoulder 22 should be spaced from 20 such that beads are free to flow through. How far 22 can be from 20 is not known. In all probability, it should not be above the bottom surface of what will be the cup, since it would be too far away to redeflect the air and prevent turbulence.

While I have shown and described the preferred form of my invention, it is to be understood that suitable additions, modifications, changes, substitutions and alterations may be made without departing from the invention's fundamental theme.

I claim:

1. In a method of filling a thin wall cup mold cavity having a spacing of from 0.030 to 0.100 inches with lightweight foam polystyrene beads impregnated with an expanding agent in which a thin wall cup mold is defined by two parts, a generally tapered core element and a correspondingly tapered cavity element, with an inlet port in the center of the cavity element in the middle of what will be the bottom of the cup and an annular outlet at what will be the lip of the cup around the periphery thereof, with an airstream through the mold cavity entering at the inlet opening in the center of the cavity element and leading through the annular outlet at what will be the lip of the cup to convey the beads into the mold cavity and an offset annulus at the small end of the core element so that the resulting cup will have an internal stacking annulus in the bottom of the cup, the improvement comprising the step of off-setting the airstream inwardly laterally opposite the offset annulus in the core element at a point between the offset annulus and the end of the core element such that the side wall of the cavity at what will be the bottom of the cup will be fully filled with beads during molding.

2. The method of claim 1 further characterized in that the offset in the core element extends throughout the full 360° thereof.

3. The method of claim 1 further characterized in that the step of defining a thin wall cup mold cavity includes defining the cup mold cavity with a spacing of from 0.030 to 0.050 inches.

* * * * *